Nov. 5, 1935.  J. W. SCOTT  2,019,735

FOCUSING OBJECTIVE

Filed June 14, 1934

Inventor:
John W. Scott,
By
Attorneys

Patented Nov. 5, 1935

2,019,735

UNITED STATES PATENT OFFICE 2,019,735

FOCUSING OBJECTIVE

John W. Scott, Rochester, N. Y., assignor to Eastman Kodak Company, Rochester, N. Y., a corporation of New York Application June 14, 1934, Serial No. 730,615

5 Claims. (Cl. 88—57)

This invention relates to photography, and more particularly to photographic objectives of the type which can be focused to produce sharp images on a predetermined plane.

One object of my invention is to provide a focusing objective including a focusing scale having graduations taking care of a normal range of focusing movement and including a signalling means for indicating to the operator when the focusing scale can be used. Another object of my invention is to provide a focusing objective with a signalling device which will be uncovered when the objective is focused on distances which are not included in the focusing scale. Another object of my invention is to provide an objective in which the range of movement of the objective is such that it can be focused on objects at an abnormal distance from the camera, and other objects will appear from the following specifications, the novel features being particularly pointed out in the claims at the end thereof.

Coming now to the drawing wherein like reference characters denote like parts throughout:

Figure 1:
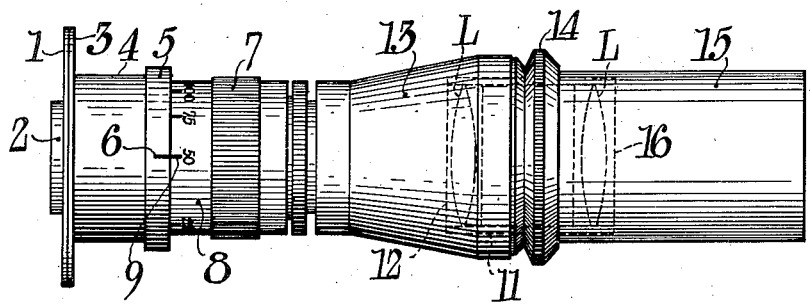
Fig. 1 is a side elevation of an objective constructed in accordance with and embodying a preferred form of my invention.

In focusing objectives, and particularly in focusing objectives for use on motion picture cameras, the parts are ordinarily arranged so that the objective can be focused through a normal range of movement and produce sharp images of objects from say 3 feet to infinity. Of course, this normal range of distance may vary somewhat with the focal length of the objective and the purpose for which the objective has been designed.

In motion picture cameras it is usually customary to have an objective move through a normal focusing range and to have a focusing scale engraved on the lens barrel to take care of this normal focusing range. The focusing scale is usually arranged so that rotation of the focusing ring through 360° will include the normal focusing range.

However, it is often desirable with lenses for special purposes to provide an abnormal focusing range, and if the 360° turn of the focusing ring is to be exceeded, it is necessary to provide some means for indicating to the user that the focusing scale can no longer be used, and that the objective is focused at what might be called an abnormal focal distance.

Thus, in a good many objectives which may be particularly used for laboratory work for other special purposes, the objective may be focused down to a very short distance and may have an abnormal focusing range of perhaps 6 inches to 3 feet, these figures being entirely by way of example. In such cases, it is usually necessary to turn the focusing ring more than the single turn (360°) so that it is necessary to indicate to an operator that the scale can no longer be used, and that the focusing must be accomplished in some other manner.

Coming now to the form of my invention illustrated in the drawing, I have here shown an objective which may be of the telephoto type and which comprises a base plate 1 having a rearward extension 2 adapted to be seated on a camera. The base plate 1 may be provided with a latching plate 3 of any standard type for holding the objective on a camera. Base plate 1 carries a relatively fixed barrel portion 4 which is provided with a flange 5 having inscribed thereon a focusing mark 6.

A knurled ring 7 is provided for turning the tubular member 8 and moving it on a threaded connection relative to the fixed barrel 4 as is usual in objectives of this type.

As the knurled ring 7 is turned, the graduations 9 of a focusing scale carried by the barrel 8 are brought opposite the marker 6, and thus for a normal range of movement, an operator can focus the objective entirely by scale.

This scale, in the present instance, is graduated from 12 feet to infinity because the objective I have used for illustrating my invention happens to be of the telephoto type which is ordinarily employed for producing large images of distant objects. Thus, for this objective the normal focal range is from 12 feet to infinity, this focusing range being accomplished by one turn of the knurled ring 7 through 360°.

However, with this objective I also may desire to focus on much shorter distances, say from 3 feet to 12 feet. In adjusting the objective for these distances, it is necessary to turn the knurled ring 7 more than one turn, and I accordingly provide a signalling device to indicate to the operator when the lens is adjusted for an abnormal focal distance—that is, a distance which is beyond the limits of the focusing scale appearing on the camera. To accomplish this, I provide a signal in the form of a color band 10, preferably red, which is in strong contrast to the color of the lens mount, which may be black or any other contrasting color.

Figure 2:
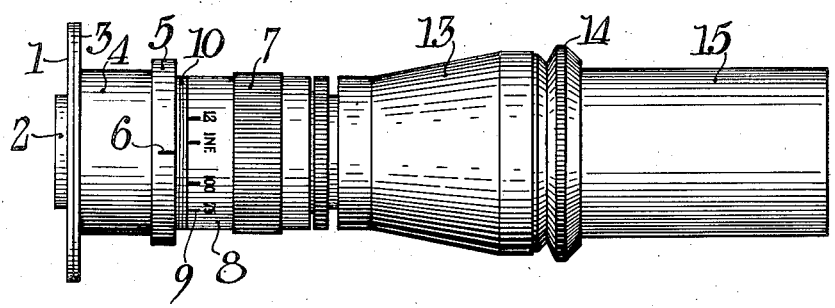
Fig. 2 is a similar view of the same objective, but with the parts adjusted for a different focal distance.

When the knurled ring 7 is turned to focus on an abnormal focus distance, as is indicated in Fig. 2, the signal 10 will be exposed and if an operator should forget the adjustment of his objective, this signal will immediately call his attention to the position of the relatively movable parts which, in this instance, are the movable barrel 8, which is tubular in form and which may telescope into the relatively fixed barrel 4, and its flange 5.

If an operator desires to focus the objective by scale for its normal range of movement, it is only necessary for him to turn the knurled ring 7 until the signal 10 is totally obscured by telescoping into the relatively fixed barrel 4. As soon as the red band can no longer be seen, the graduations 9 on the focusing scale can be used to focus the objective by bringing these opposite to the pointer 6 on the relatively fixed part of the focusing objective.

In the illustrated embodiment of my invention, the objective is of the type in which there are elements L in fixed relation in a barrel 11, one end of which 12 is secured in the tubular housing 13.

There is also a knurled ring 14 which controls the usual diaphragm (not shown) for varying the aperture through which light passes to the film. It is customary to provide lenses with lens hoods, and in the embodiment shown, the tubular member 15 slides on an end 16 of the lens barrel 11. This construction may be of any well-known type and is described only to make the entire construction clear, although the member and arrangement of lenses in the complete objective is immaterial.

In the specification and claims I have referred to a "focusing objective", this being intended to refer either to an objective which can be moved in its entirety for focusing without altering the spacing of any of the lens elements, or to an objective of the type in which one or more elements may be moved relative to other lens elements to accomplish focusing.

It is very obvious that the form of my invention illustrated in the drawing is only one form which my invention can take. Because the indicating signal is particularly useful for objectives of long focal length, I have illustrated my invention as applied to a telephoto lens, although it is quite obvious that this invention would be equally useful on lenses of normal focal length and even on objectives having a focal length shorter than normal.

It is to be understood that when the objective is equipped with a signal indicating that it is set for an abnormal range of movement which may be focused to include objects closer than those which can be focused by scale, the objective can then be focused on a ground glass, through a prism, or any other well-known device used in motion picture cameras. It is also possible to provide an objective with a scale in which the normal range of movement takes care of objects which are close to the camera and the abnormal range may take care of only distant objects. However, for most purposes, I have found that the signal is generally most useful when applied in the manner described fully in this application and illustrated in the drawing.

Having thus described my invention, what I claim as new and desire to secure by Letters Patent of the United States is:

1. In an objective adapted to be focused through a normal and an abnormal range of distances, a mount for the objective including a movable and an immovable part, said parts being adapted to cooperate, and an annular signalling means carried by one part and adapted to be covered by the other part throughout the normal focusing movement of said objective and adapted to be uncovered throughout the abnormal focusing movement thereof, whereby the signalling means may be viewed throughout the circumference of the objective.

2. In an objective adapted to be focused through a normal and an abnormal range of distances, a mount for the objective including a movable and an immovable part, said parts being tubular in shape, one being adapted to telescope the other, a signalling device on one tubular part and extending completely around said part and adapted to be covered by the other part throughout its range of movement for normal distances and to be uncovered when the parts are relatively moved to focus on abnormal distances.

3. In an objective adapted to be focused through a normal and an abnormal range of distances, a mount for the objective including a movable and an immovable part, said parts being relatively moved for focusing the objective, a focusing scale carried by one part and a pointer carried by the other adapted to indicate the normal range of focusing movement, and a signalling device comprising a colored band extending entirely around one part and arranged to indicate to an operator when the parts have been moved to adjust the objective to focus on distances beyond the limits of the focusing scale.

4. In an objective adapted to be focused through a normal and an abnormal range of distances, a mount for the objective including a movable and an immovable part adapted to telescope more or less in moving relative to each other for focusing the objective, a focusing scale for indicating the focal setting of the objective for a normal focusing range, and a signalling device comprising a colored band carried by one telescoping part and adapted to be covered by the other telescoping part when the focusing scale is adjusted for normal focusing movement.

5. In an objective adapted to be focused through a normal and through an abnormal range of distances, a mount for the objective including a tubular relatively fixed part and a tubular, relatively movable part adapted to move to and from and into the relatively fixed part, a focusing scale comprising graduations on one part and a pointer on the other part to indicate focal distances through a normal range of distances, and a signalling device carried by said objective and comprising a band colored red in position to be exposed when said movable part is moved to focus the objective on objects at an abnormal focal distance whereby it may indicate to an operator that the focusing scale should not be used.

JOHN W. SCOTT.